(12) United States Patent
Geissler et al.

(10) Patent No.: US 10,778,033 B2
(45) Date of Patent: Sep. 15, 2020

(54) CONNECTION ELEMENT, SENSOR, AND SENSOR ARRANGEMENT FOR PROCESS AUTOMATION

(71) Applicant: Endress+Hauser Conducta GmbH+Co. KG, Gerlingen (DE)

(72) Inventors: Sebastian Geissler, Geithain (DE); Stefan Pilz, Geithain (DE); Sven-Matthias Scheibe, Reichenberg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 189 days.

(21) Appl. No.: 16/012,149

(22) Filed: Jun. 19, 2018

(65) Prior Publication Data
US 2018/0366983 A1 Dec. 20, 2018

(30) Foreign Application Priority Data
Jun. 19, 2017 (DE) .......................... 10 2017 113 420

(51) Int. Cl.
*H02J 50/10* (2016.01)
*H02J 7/02* (2016.01)
(Continued)

(52) U.S. Cl.
CPC .............. *H02J 50/10* (2016.02); *G01B 7/003* (2013.01); *G08C 17/04* (2013.01); *H01F 3/10* (2013.01); *H01F 17/045* (2013.01); *H01F 38/14* (2013.01); *H02J 5/005* (2013.01); *H02J 7/025* (2013.01); *H04B 5/0031* (2013.01); *H04B 5/0037* (2013.01); *H04B 5/0075* (2013.01)

(58) Field of Classification Search
CPC . H02J 50/10; H02J 5/005; H02J 7/025; G01B 7/003; G08C 17/04; H01F 3/10; H01F 17/045; H04B 5/0031; H04B 5/0037; H04B 5/0075
See application file for complete search history.

(56) References Cited

U.S. PATENT DOCUMENTS

| | | | |
|---|---|---|---|
| 2010/0156193 A1* | 6/2010 | Rhodes | G06F 1/1632 307/104 |
| 2015/0364931 A1 | 12/2015 | Ren et al. | |
| 2016/0162053 A1 | 6/2016 | Obata | |

FOREIGN PATENT DOCUMENTS

DE 102015112949 A1 2/2017

OTHER PUBLICATIONS

Search Report for German Patent Application No. 10 2017 113 420.4, German Patent Office, dated Apr. 18, 2018, 11 pp.

* cited by examiner

*Primary Examiner* — Carlos Amaya
(74) *Attorney, Agent, or Firm* — Christopher R. Powers; Endress+Hausser (USA) Holding Inc.

(57) ABSTRACT

The present disclosure discloses a connection element comprising an essentially cylindrical core, a primary coil for transmission and reception of data and/or for transmission of energy from or to a secondary coil, wherein the primary coil surrounds the core, and a first coupling body with a first segment and a second segment, wherein the second segment comprises the primary coil. In the connection element, the core at one end comprises a first magnetic body that is greater in diameter than the core and extends into the first segment. The present disclosure likewise discloses a sensor, as well as a sensor connection element including such a sensor and such a connection element.

14 Claims, 3 Drawing Sheets

(51) Int. Cl.
*G08C 17/04* (2006.01)
*H01F 38/14* (2006.01)
*G01B 7/00* (2006.01)
*H01F 3/10* (2006.01)
*H04B 5/00* (2006.01)
*H01F 17/04* (2006.01)
*H02J 5/00* (2016.01)

CONNECTION ELEMENT, SENSOR, AND SENSOR ARRANGEMENT FOR PROCESS AUTOMATION

The present application is related to and claims the priority benefit of German Patent Application No. 10 2017 113 420.4, filed on Jun. 19, 2017, the entire contents of which are incorporated herein by reference.

TECHNICAL FIELD

The present disclosure relates to a connection element, a sensor, and a sensor arrangement for process automation.

BACKGROUND

Typically, a cable for connection to a sensor is connected to a transmitter, also referred to as a measuring transducer. The connection of cable to sensor is frequently accomplished via a plug connection, e.g., via galvanically-decoupled—for example, inductive—interfaces. A connection element which comprises the plug connection is located at the end of the cable.

Thus, electrical signals can be transmitted contactlessly. Advantages with respect to corrosion protection, electrical isolation, prevention of mechanical wear of the plug, etc., are provided by this galvanic isolation. The Applicant markets such systems under the name, "Memosens."

The inductive interfaces in question are usually implemented as a system having two coils that are plugged into each other, e.g., via the plug connection in question. These are referred to as the primary coil on the side of the connection element and secondary coil on the side of the sensor. They form a transformer. Typically, both data (in both directions) as well as energy (from connection side to sensor side) are transmitted. The energy thereby needs to be large enough that the connected sensor is sufficiently supplied with power.

The magnetic coupling of the two coils determines the efficiency of the transformer, and therefore the quality of the signal transfer and energy transfer.

SUMMARY

The present disclosure is based upon the aim of improving the coupling between sensor and connection element.

The aim is achieved via a connection element comprising: an essentially cylindrical core; a primary coil for transmission and reception of data and/or for transmission of energy from or to a secondary coil, wherein the primary coil surrounds the core; and a first coupling body with a first segment and a second segment, wherein the second segment comprises the primary coil. The connection element is characterized in that the core at one end comprises a first magnetic body that is greater in diameter than the core and extends into the first segment.

Via this arrangement, the coupling and the inductance of the transformer increase, the losses decrease, and the efficiency therefore rises. At the output of the secondary side, more power is thus made available, given consistently supplied power on the primary side.

In one embodiment, the primary coil comprises fewer windings than the known inductor from the prior art. Due to the fewer windings in comparison to the prior art, both the direct current losses (e.g., RDC or copper resistance) and the alternating current losses (e.g., parasitic capacitance, eddy current losses) are markedly reduced, and thus the efficiency is increased.

These improvements additionally increase the design freedom of the connection element.

In one embodiment, the second segment extends in the shape of a rod from the first segment and is smaller in diameter than the first segment.

In one embodiment, the diameter of the first magnetic body essentially corresponds to the diameter of the first segment. The coupling may thereby be increased, and the air gap between secondary coil and primary coil is reduced.

In one embodiment, a circuit board is arranged in the first segment, wherein the primary coil is electrically connected to the circuit board. The signals of the coil may thereby be relayed simply. A mechanical connection of the primary coil to the circuit board additionally takes place.

In one embodiment, at the end of the core facing away from the first body, the core comprises a second magnetic body that is larger in its diameter than the core. The coupling may thereby be increased. The core thus essentially corresponds to a dumbbell-shaped core. In one embodiment, the first magnetic body is larger than the second magnetic body. Both magnetic bodies have essentially the dimensions of the respective housing segments, i.e., of the first segment and the second segment.

In one embodiment, the first and/or the second body is designed like a disc. In the context of the present disclosure, what is to be understood as "like a disc" is an actual disc, but also embodiments having multiple corners. In general, the bodies may also comprise more than or exactly three corners. In one embodiment, at least one of the two bodies comprises six corners.

In one embodiment, the core, the first body and/or the second body are comprised of a material having a relative permeability of greater than 1. The core is either made from a single material, or, alternatively consists of a composite material. The core may also comprise amorphous materials.

The aim is further achieved via a sensor comprising: at least one sensor element for detecting a process automation measurand; a secondary coil for transmitting and receiving data and for receiving data from or to a primary coil; and a second coupling body that is designed to complement a first coupling body, wherein the second coupling body comprises the secondary coil. The sensor is characterized in that the secondary coil surrounds a magnetic body.

As with the sensor arrangement, the magnetic body ensures a better coupling to an opposite side.

The secondary coil is cylindrically wound around an inner part. The magnetic body externally surrounds the coil.

In one embodiment, the magnetic body is designed in the shape of a cup. The magnetic body thus surrounds the coil. The magnetic loop is thereby closed, the coupling is increased, and the efficiency rises. The windings may thereby be reduced at least in one of the coils. Due to the fewer windings, both the direct current losses (e.g., direct current resistance or copper resistance) and the alternating current losses (e.g., parasitic capacitance, eddy current losses) are markedly reduced, and thus the efficiency is increased.

The aim is further achieved via a sensor arrangement comprising a connection element described above and a sensor described above.

BRIEF DESCRIPTION OF THE DRAWINGS

This will be explained in more detail with reference to the following figures. These show.

In the figures, the same features are identified with the same reference characters.

DETAILED DESCRIPTION

Figure 1:
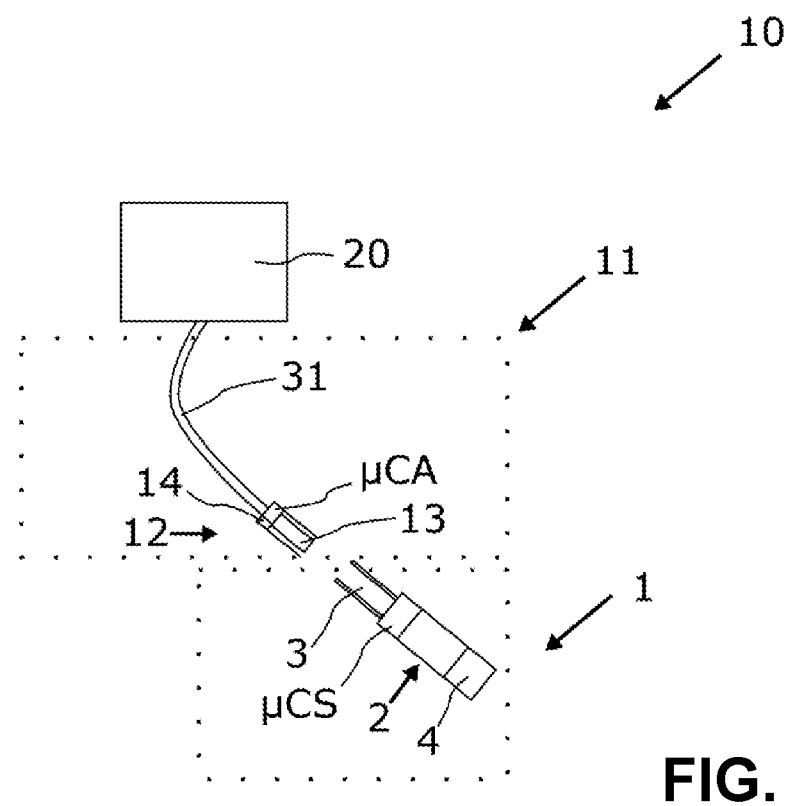
FIGS. 1A and 1B show a sensor arrangement in a schematic view and in partial cross-section.
Figure 1B:
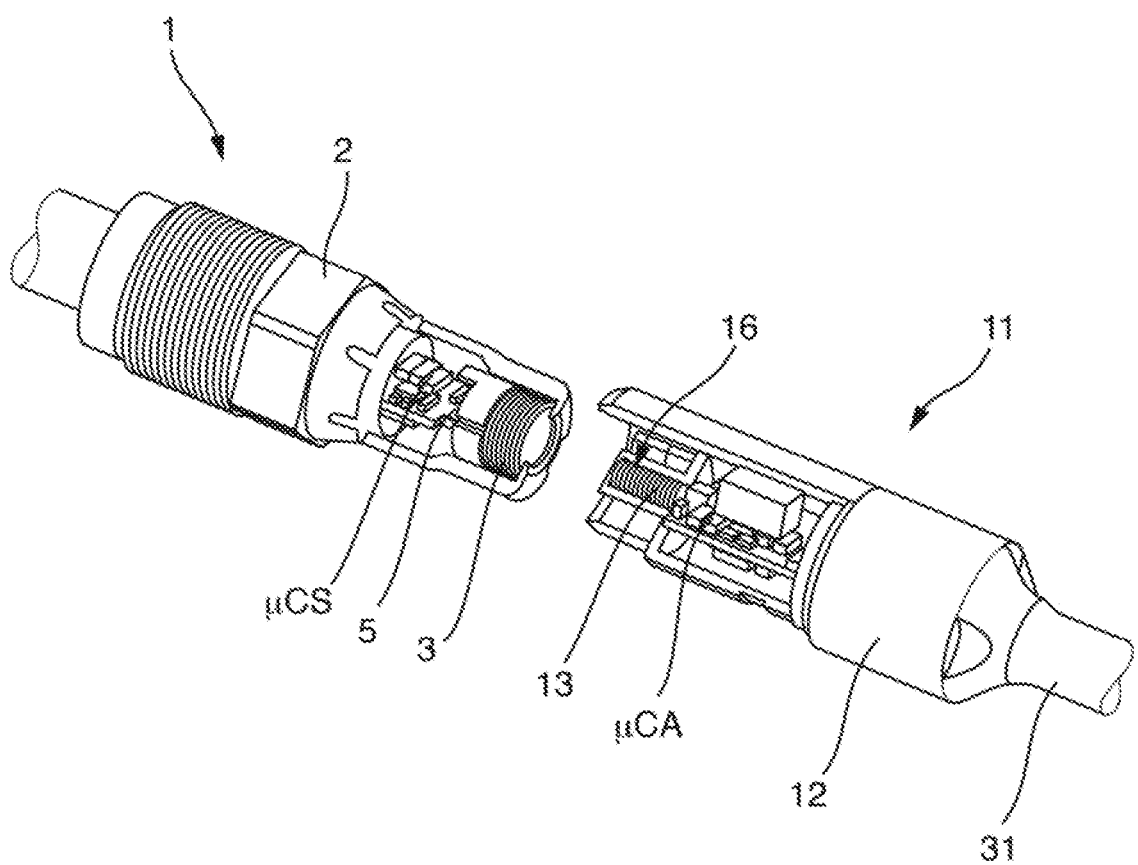

A sensor arrangement 10 comprises a sensor 1 and a connection element 11, which shall be discussed first. The sensor arrangement 10 is depicted in FIG. 1A and FIG. 1B. A sensor 1 communicates with a superordinate unit 20 via an interface 3. In the example, a transmitter is connected. The transmitter is in turn connected to a control system (not depicted). In one embodiment, sensor 1 communicates directly with a control system via the connection element 11. A cable 31 is connected at the sensor side to the transmitter 20, and its other end comprises an interface 13 that is complementary to interface 3. The connection element 11 comprises the cable 31 along with interface 13. The interfaces 3, 13 are designed as galvanically-separated—for example, as inductive—interfaces, which can be coupled with one another by means of a mechanical plug connection. The mechanical plug connection is hermetically sealed so that no fluid, such as the medium to be measured, air or dust, can enter from the outside.

The interfaces 3, 13 are designed as coils; in the context of this disclosure, these are also referred to as primary coil 13 and secondary coil 3. In the context of this disclosure, the terms, "inductive interface" and "coil", shall be used equally. The primary coil 13 surrounds a core 16.

Both the sensor 1 and the connection element 11 comprise at least one circuit board 5 or 15, on which are arranged the electrical components, for instance, the data processing unit µCS and µCA (see below). The coils 3, 13 are, respectively, connected electrically—and, if applicable, also mechanically—to the circuit boards 5, 15.

Data (bi-directional) and power (uni-directional, i.e., from connection element 11 to sensor 1) are transmitted or transferred via the interfaces 3, 13. The sensor arrangement 10 is used predominantly in process automation.

The sensor 1 therefore comprises at least one sensor element 4 for detecting a process automation measurand. The sensor 1 is, then, for instance, a pH sensor, e.g., as ISFET, in general, an ion-selective sensor; a sensor for measurement of the redox potential from the absorption of electromagnetic waves in the medium, e.g., of wavelengths in the UV, IR and/or visible range; of the oxygen; of the conductivity; of the turbidity; of the concentration of non-metallic materials or of the temperature, with the respective corresponding measurand.

The sensor 1 comprises a coupling body 2 which comprises the interface 3. As mentioned, the interface 3 is designed for the transmission of a value that depends upon the measurand to the second interface 13. The sensor 1 comprises a data processing unit µCS, such as a microcontroller, which processes the values of the measurand, for instance, converts them into a different data format. In this way, for instance, an averaging, pre-processing and digital conversion can be accomplished by the data processing unit µCS.

The sensor 1 can be connected via the interfaces 3, 13 to the connection element 11, and, ultimately, to the superordinate unit 20. As mentioned, the superordinate unit 20 may be a transmitter or a control center, for example. The data processing unit µCS converts the value that depends upon the measurand (i.e., the measured signal of sensor element 4) into a protocol understandable to the transmitter or the control center. Examples of this include, for example, the proprietary Memosens protocol, HART, wirelessHART, Modbus, Profibus Fieldbus, WLAN, ZigBee, Bluetooth or RFID. This translation can also be carried out in a separate communications unit instead of in the data processing unit, wherein the communications unit is arranged on the side of the sensor 1 or of the connection element 11. The aforementioned protocols also include wireless protocols, so that a corresponding communications unit includes a wireless module. The coils 3, 13 are thus designed for bi-directional communication between sensor 1 and superordinate unit 20. As mentioned, along with communication, the coils 3, 13 also ensure the supply of power to the sensor 1.

The connection element 11 comprises the interface 13, wherein this interface 13 is designed to be complementary to the other interface 3. The connection element 11 likewise comprises a data processing unit µCA. The data processing unit µCA may serve as a repeater for the transmitted signal. Furthermore, the data processing unit µCA can convert or modify the protocol. For example, data can be transmitted in a proprietary protocol from sensor 1 to the connection element 11, whereas the data processing unit µCA on the side of the connection element 11 converts this proprietary protocol into a bus protocol (see above). Connection element 11 comprises a modulator 14 that modulates the data to its output. Modulator 14 may be designed, for example, as a load modulator. Alternatively, the data processing unit µCA can also modulate the data. The data are transmitted via amplitude shift keying. Alternative keying possibilities include frequency shift keying or phase shift keying.

The connection element 11 comprises a cylindrical coupling body 12 that is designed to be complementary to the coupling body 2 and which, with a sleeve-like end segment, can be slipped onto the first coupling body 2, wherein the interface 13 is plugged into the interface 3. An opposite arrangement, in which the interface 13 has a sleeve-like design and the interface 3 has a plug-like design, is possible without any inventive step.

Figure 2:
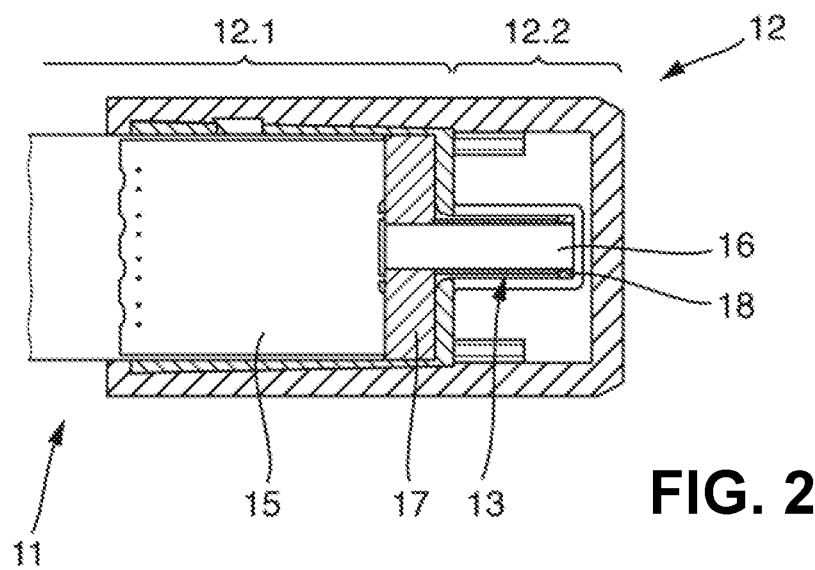
FIG. 2 shows an end segment of a connection element in cross-section.

FIG. 2 shows a terminal segment of the connection element 11, and, in fact, the part that faces toward the sensor 1. The connection element 11 is divided into a first segment 12.1 which comprises the circuit board 15, among other things, and a second segment 12.2 that comprises the primary coil 13.

At the ends of the core 16 of the primary coil 13, magnetic bodies 17 and 18, having a relative permeability >1, are attached such that the magnetic field lines take the path through these materials, and the coupling between primary coil 13 and secondary coil 3 is thereby improved. The core 16 and the bodies 17, 18 may consist of one piece, and the core 16 thus has a dumbbell shape. The core 16, together with bodies 17, 18, may also be designed as a composite material. The majority of the core 16 may be located in the second segment 12.2.

The first body 17 is of greater diameter than the core 16 and extends into the first segment 12.1. The diameter corresponds essentially to the maximum diameter of the connection element 11, i.e., to that of the first segment 12.1, in order to achieve a maximum coupling.

The first magnetic body 17 is arranged in the direction of the circuit board 15. The second magnetic body 18 is arranged in the direction of sensor 1. Both bodies 17, 18 are essentially as large as the respective housing segments 12.1, 12.2.

The bodies 17, 18 have the shape of discs. The discs may also have outer geometric contours other than round. As an example, a regular hexagon is cited herein.

The core 16 comprises at the other end, i.e., at the end facing away from the first magnetic body 17, the second magnetic body 18, which likewise has a larger diameter than the core 16. The second magnetic body 18 has a smaller diameter than the first magnetic body 17.

Figure 3:
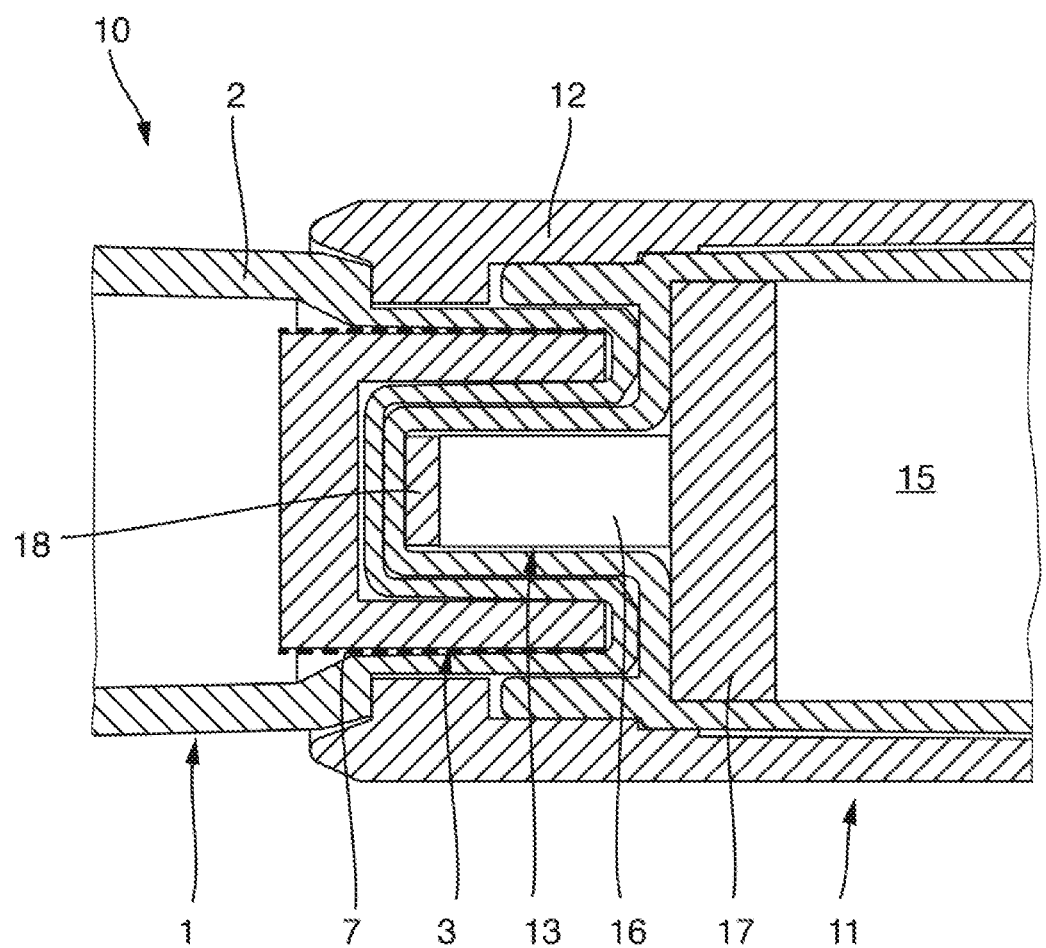
FIG. 3 shows a sensor arrangement with connection element and sensor in cross-section with shown magnetic bodies.

FIG. 3 shows the sensor arrangement 10 in cross-section. Sensor 1 and connection element 11 are thereby plugged into one another. The core 16 of the connection element 11, together with the magnetic bodies 17, 18 at the respective ends of the core 16, are shown, as described above. The primary coil 13 is wound around the core 16 and, to the right in FIG. 3, is electrically connected to the circuit board 15.

The sensor 1 comprises the secondary coil 3. The coil 3 is wound around a "core," wherein this core does not consist of a material with a relative permeability >1, but, rather, serves only for the mechanical attachment of the coil 3. This core is made from a plastic, for instance. Around the secondary coil 3, the sensor 1 comprises a magnetic body 7. The magnetic body 7 is designed like a cup. The magnetic body 7 is made from a material having a relative permeability >1, in order to increase the coupling between the coils 3, 13.

The invention claimed is:

1. A connection element, comprising:
   a core including a substantially cylindrically shaped center part;
   a primary coil, wherein the primary coil surrounds the core;
   a secondary coil, wherein the primary coil is adapted for transmission and reception of data from or to the secondary coil and/or transmission of energy to the secondary coil, which is adapted for transmission and reception of data from or to the primary coil and/or transmission of energy from the primary coil; and
   a first coupling body including a first segment and a second segment, wherein the second segment includes the primary coil,
   wherein the core at a proximal end includes a first magnetic body greater in diameter than the center part of the core and extending into the first segment, and
   wherein the core at a distal end includes a second magnetic body greater in diameter than the center part.

2. The connection element of claim 1, wherein the second segment extends from the first segment, has a substantially rod shape and is of smaller diameter than the first segment.

3. The connection element of claim 1, wherein a diameter of the first magnetic body essentially corresponds to the diameter of the first segment.

4. The connection element of claim 1, further comprising a circuit board disposed in the first segment and electrically connected to the primary coil.

5. The connection element of claim 1, wherein the first magnetic body and/or the second magnetic body are substantially disk-shaped.

6. The connection element of claim 1, wherein the core, the first magnetic body, and/or the second magnetic body are of a material having a relative permeability of greater than 1.

7. A sensor arrangement for process automation, comprising:
   at least one sensor element embodied for the detection of a process automation measurand; and
   a connection element, comprising:
   a core;
   a primary coil, wherein the primary coil surrounds the core;
   a secondary coil, wherein the primary coil is adapted for transmission and reception of data from or to the secondary coil and/or transmission of energy to the secondary coil, which is adapted for transmission and reception of data from or to the primary coil and/or transmission of energy from the primary coil; and
   a first coupling body including a first segment and a second segment, wherein the second segment includes the primary coil,
   wherein the core at a proximal end includes a first magnetic body greater in diameter than a center part of the core and extending into the first segment, and
   wherein the core at a distal end includes a second magnetic body greater in diameter than the center part.

8. The sensor arrangement of claim 7, wherein the second segment extends from the first segment, has a substantially rod shape, and is of smaller diameter than the first segment.

9. The sensor arrangement of claim 7, wherein a diameter of the first magnetic body essentially corresponds to the diameter of the first segment.

10. The sensor arrangement of claim 7, further comprising a circuit board disposed in the first segment and electrically connected to the primary coil.

11. The sensor arrangement of claim 7, wherein the first magnetic body and/or the second magnetic body are substantially disk-shaped.

12. The sensor arrangement of claim 7, wherein the core, the first magnetic body, and/or the second magnetic body are of a material having a relative permeability of greater than 1.

13. The connection element of claim 1, wherein the core, first magnetic body and second magnetic body define a single, integrated member having a generally dumbbell shape.

14. The sensor arrangement of claim 7, wherein the core, first magnetic body and second magnetic body define a single, integrated member having a generally dumbbell shape.

* * * * *